United States Patent Office 3,025,249
Patented Mar. 13, 1962

3,025,249
FOAMED RESIN OBTAINED BY THE REACTION OF A POLYEPOXIDE, A TRIALKYLBOROXINE AND AN AMINE
Harold H. Chen, Oakland, Calif., assignor to Shell Oil Company, New York, N.Y., a corporation of Delaware
No Drawing. Filed Feb. 29, 1960, Ser. No. 11,492
4 Claims. (Cl. 260—2.5)

This invention relates to expanded cellular resinous materials and to methods of producing them. More particularly, the invention relates to expanded cellular thermoset epoxy resin compositions of outstanding thermal stability.

It is known that polyepoxides can be converted by reaction with so-called curing agents or hardening agents into thermoset resins having various desirable characteristics such as hardness and resistance to a variety of chemicals. Amines are known as a group of compounds which may be used as curing agents for epoxy resins. It is also known that epoxy resins can be foamed by mixing the uncured liquid resin with a so-called blowing agent, which is conventionally a chemical compound which decomposes under the influence of heat with the liberation of a gas. One of the disadvantages of a system consisting of an epoxy resin, a conventional curing agent, and a conventional blowing agent which creates gas by thermal decomposition is that such blowing agents are not capable of interreacting with the resin curing agent and thus non-gaseous portions thereof are present in the final cured cellular resin structure as a separate and chemically unconnected material, generally with the effect of weakening the resin structure. Most blowing agents are solids and failure of these solids to distribute equally causes uneven foaming and results in still further weakening of the foams.

Although foamed epoxy resins known to the art have various desirable and useful properties they are generally not suitable for use at elevated temperatures, e.g., 400–600° F. Strength at such elevated temperatures is important in some applications, including, for example, structure parts of high speed aircraft and missiles.

One particular composition containing epoxy resinous material is known to have good high temperature properties. This composition comprises a major part of a phenolic resin and a minor part of a normally solid epoxy resin. The composition is in commercial use but it has the drawback that it must be stored under refrigeration until expanded and that it must be held for several hours at elevated temperatures up to 330° F. for curing.

It is an object of this invention to provide epoxy-containing resins of novel composition.

It is another object of this invention to provide thermoset expanded epoxy resin compositions suitable for use at elevated temperatures in the range of 400–600° F.

It is another object to provide a convenient method for preparing expanded cellular epoxy resin compositions which are suitable for use at elevated temperatures.

Other objects of this invention will appear from the following description thereof.

In accordance with this invention liquid epoxy resins are combined with a minor amount of an amine and a minor amount of a trialkoxyboroxine having alkyl groups of one to four carbon atoms; the resulting mixture is allowed to react with the liberation of substantial amounts of heat and substantial amounts of volatile lower alkanols, whereby it is converted into an expanded cellular foam structure which cures normally without the provision of additional external heat, resulting in a thermoset resin foam having excellent strength characteristics at high temperatures, e.g., in the range of 400–600° F.

The following terminology is adopted herein. Expanded cellular structures, whether or not fully cured, are referred to as "foam," "resin foam," or "foamed resin." Mixtures comprising uncured resin, amine and trialkylboroxine are referred to as "foamable mixtures." Trialkoxyboroxine may be abbreviated TAB and trimethoxyboroxine TMB.

So far as is known, trialkoxyboroxines have not been previously used in the production of resin foams. The compounds are known to react with aromatic amines. It has now been found that when amines, preferably a primary or secondary polyamine, and a lower trialkoxyboroxine are mixed with a liquid epoxy resin the components interreact to form a foam in which all chemical components are interlinked in a strong resin structure.

The foamable resin mixtures of this invention may be modified by inclusion of a vaporizable fluid which is completely soluble in the liquid resin composition at atmospheric temperature but which vaporizes therefrom at elevated temperatures. Addition of such a fluid, particularly when trichlorofluoromethane or a similar compound is selected, results in several changes of the present foams, particularly smaller cell size, lower density of the foam, lower viscosity of the foamable composition, better insulating properties of the resulting foam and a slightly longer time period between admixing of the components and the expansion of the mixture.

COMPONENTS USED IN PREPARING THE NOVEL RESIN FOAMS

Polyepoxides

The polyepoxides to be used in preparing the compositions of this invention comprise those materials possessing more than one vicinal epoxy or oxirane group, i.e., more than one

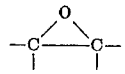

group. These polyepoxides may be saturated or unsaturated, aliphatic, cycloaliphatic, aromatic, or heterocyclic and may be substituted with non-interfering substituents such as chlorine, alkoxy groups and the like. They may be monomeric or polymeric.

For clarity, many of the polyepoxides, and particularly those of the polymeric type are described in terms of "epoxy equivalent" values. This expression refers to the average number of epoxy groups contained in the average molecule. The epoxy equivalent value is obtained by dividing the average molecular weight of the polyepoxide by the epoxide equivalent weight. The epoxide equivalent weight is determined by heating a sample of the polyepoxide with an excess of pyridinium chloride dissolved in pyridine and back titrating the excess pyridinium chloride with 0.1 N sodium hydroxide to the phenolphthalein end point. The epoxide value is calculated by considering one HCl as equivalent to one epoxide group. This method is used to obtain epoxide equivalent values referred to herein.

If the polyepoxide material is a single compound having all of the epoxy groups intact, the epoxy equivalent value will be an integer, such as 2, 3, 4, and the like. However, in the case of polymeric polyepoxides the material may contain some of the monomeric epoxide or have some of the epoxy groups hydrated or otherwise reacted and/or contain macromolecules of various molecular weights, so that the epoxy equivalency may be quite low and include fractional values. The polymeric material may, for example, have an epoxy equivalent value of 1.5, 1.8, 2.5, and the like. Another suitable description of epoxide content of an epoxy compound is in terms of epoxy equivalents per 100 grams.

The monomeric-type of polyepoxide compounds may be exemplified by the following:

vinyl cyclohexene dioxide,
epoxidized soyabean oil,
butadiene dioxide,
1,4-bis(2,3-epoxypropoxy)benzene,
1,3-bis(2,3-epoxypropoxy)benzene,
4,4'-bis(2,3-epoxypropoxy)diphenyl ether,
1,8-bis(2,3-epoxypropoxy)octane,
1,4-bis(2,3-epoxypropoxy)cyclohexane,
4,4'-bis(2-hydroxy - 3,4 - epoxybutoxy)diphenyldimethylmethane,
1,3-bis(4,5-epoxypentoxy)-5-chlorobenzene,
1,4-bis(3,4-epoxybutoxy)-2-chlorocyclohexane,
diglycidyl ether,
1,3-bis(2-hydroxy-3,4-epoxybutoxy)benzene,
1,4-bis(2-hydroxy-4,5-epoxypentoxy)benzene,
1,2,5,6-di-epoxy-3-hexyne,
1,2,5,6-diepoxyhexane,
and 1,2,3,4-tetra(2-hydroxy-3,4-epoxybutoxy)butane.

Other examples of this type include the glycidyl polyethers of the polyhydric phenols obtained by reacting a polyhydric phenol with a great excess, e.g., 4 to 10 mol excess, of a halogen-containing epoxide in an alkaline medium. Thus, polyether A described hereinafter, which is substantially 2,2-bis(2,3-epoxypropoxyphenyl)propane is obtained by reacting bis-phenol (2,2-bis(4-hydroxyphenyl)propane) with an excess of epichlorohydrin as indicated below. Other polyhydric phenols that can be used for this purpose include resorcinol, catechol, hydroquinone, methyl resorcinol, or polynuclear phenols, such as 2,2 - bis(4 - hydroxyphenyl)butane, 4,4'-dihydrobenzophenone, bis(4-hydroxyphenyl)ethane, and 1,5-dihydroxynaphthalene. The halogen-containing epoxides may be further exemplified by 3-chloro-1,2-epoxybutane, 3-bromo-1,3-epoxyhexane, 3-chloro-1,2-epoxyoctane, and the like.

Examples of the polymeric-type polyepoxides include the polyepoxypolyhydroxy polyethers obtained by reacting, preferably in an alkaline or an acid medium, a polyhydric alcohol or polyhydric phenol with a polyepoxide, such as the reaction product of glycerol and bis(2,2-epoxypropyl)ether, the reaction product of sorbitol and bis(2,3-epoxy-2-methylpropyl)ether, the reaction product of pentaerythritol and 1,2-epoxy-4,5-epoxypentane, and the reaction product of bisphenol and bis(2,3-epoxy-2-methylpropyl)ether, the reaction product of resorcinol and bis(2,3-epoxypropyl)ether, and the reaction product of catachol and bis(2,3-epoxypropyl)ether.

A further group of the polymeric polyepoxides comprises the hydroxy-substituted polyepoxy polyethers obtained by reacting, preferably in an alkaline medium, a slight excess, e.g., 5 to 3 mol excess, of a halogen-containing epoxide as described above, with any of the aforedescribed polyhydric phenols, such as resorcinol, catechol, bis-phenyl, bis(2,2'-dihydroxy-dinaphthyl)methane, and the like.

Also included within this group are the polyepoxy polyethers obtained by reacting, preferably in the presence of an acid-acting compound, such as hydrofluoric acid, one of the aforedescribed halogen-containing epoxides with a polyhydric alcohol, such as glycerol, propylene glycol, ethylene glycol, trimethylene glycol, butylene glycol, and the like, and subsequently treating the resulting product with an alkaline component.

Other polymeric polyepoxide compounds include the polymers and copolymers of the epoxy-containing monomers possessing at least one polymerizable ethylenic linkage. When this type of monomer is polymerized in the substantial absence of alkaline or acidic catalysts, such as in the presence of heat, oxygen, peroxy compound, actinic light, and the like, they undergo addition polymerization at the multiple bond leaving the epoxy group unaffected. These monomers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chloroallyl acetate, and vinyl methallyl pimelate. Illustrative examples of these polymers include poly(allyl 2,3- epoxypropyl ether), poly(2,3-epoxypropyl crotonate), allyl 2,3-epoxypropyl ether-styrene copolymer, methallyl 3,4-epoxybutyl ether-allyl benzoate copolymer, poly(vinyl 2,3-epoxypropyl ether), allyl glycidyl ether-vinyl acetate copolymer and poly(4-glycidyloxy-styrene).

Particularly preferred groups of epoxy-containing organic materials to be employed in the process of the invention are the monomeric and polymeric-type glycidyl polyethers of dihydric phenols obtained by reacting epichlorohydrin with a dihydric phenol in an alkaline medium. The monomeric products of this type may be represented by the general formula

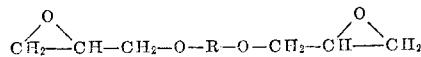

wherein R represents a divalent hydrocarbon radical of the dihydric phenol. The polymeric products will generally not be a single simple molecule but will be a complex mixture of glycidyl polyethers of the general formula

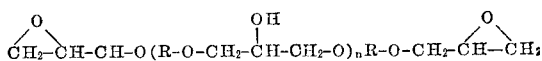

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of material with one or both of the terminal glycidyl radicals in hydrated form.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

Preferred members of the above-described group of polyepoxides are the glycidyl polyethers of the dihydric phenols, and especially 2,2-bis(4-hydroxyphenyl)propane, having an epoxy equivalency between 1.0 and 2.0 and a molecular weight between 300 and 500. Particularly preferred are those having a Durrans' Mercury Method softening point no greater than 30° C.

The polyepoxide used in producing the composition of this invention must be in liquid form at atmospheric temperature or at slightly elevated temperature, up to about 100° F. It is preferred to use a polyepoxide such as polyether A, described below, which is made up of substantially similar molecules. However, in some compositions it may be desirable to use a mixture of different polyepoxides including some normally solid ones which are composited with normally liquid polyepoxides in such a manner that the total mixture of polyepoxides is a liquid at about atmospheric temperature.

The preparation of some of the glycidyl polyethers will be illustrated below. Unless other specified, parts indicated are parts by weight.

PREPARATION OF GLYCIDYL POLYETHERS OF DIHYDRIC PHENOLS

Polyether A

About 2 mols of bis-phenol was dissolved in 10 mols of epichlorohydrin and 1 to 2% water added to the resulting mixture. The mixture was then brought to 80° C. and 4 moles of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal quantity by weight of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value eq./100 g. of 0.50 so the epoxy equivalency was 1.75. For convenience, this product will be referred to hereinafter as Polyether A.

Polyether B

About 228 parts of bis-phenol and 75 parts sodium hydroxide as a 10% aqueous solution were combined and heated to about 45° C. whereupon 145 parts of epichlorohydrin was added rapidly. The temperature increased and remained at about 95° C. for 30 minutes. The mixture separated into a two-phase system and the aqueous layer was drawn off. The resinous layer that remained was washed with hot water and then drained and dried at a temperature of 130° C. The Durrans' Mercury Method melting point of the resulting product is 70° C., and the molecular weight about 900. The product had an epoxy value of 0.20 eq./100 g. so the epoxy equivalency is 1.8.

Also of special interest are the polyglycidyl polyethers of polyhydric alcohols obtained by reacting the polyhydric alcohol with epichlorohydrin, preferably in the presence of 0.1% to 5% of an acid-acting compound, such as boron trifluoride, hydrofluoric acid or stannic chloride. This reaction is effected at about 50° C. to 125° C. with the proportions of reactants being such that there is about one mol of epichlorohydrin for every equivalent of hydroxyl group in the polyhydric alcohol. The resulting chlorohydrin ether is then preferably dehydrochlorinated by heating at about 50° C. to 125° C. with a small, e.g. 10% stoichiometrical excess of a base, such as sodium aluminate.

The preparation of the polyglycidyl ethers of polyhydric alcohols is illustrated below.

PREPARATION OF GLYCIDYL POLYETHERS OF POLYHYDRIC ALCOHOLS

Polyether C

About 276 parts (3 mols) of glycerol was mixed with 832 parts (9 mols) of epichlorohydrin. To this reaction mixture was added 10 parts of diethyl ether solution containing about 4.5% boron trifluoride. The temperature rose as a result of the exothermic reaction and external cooling with ice water was applied to keep the temperature between about 50° C. and 75° C. during a reaction period of about 3 hours. About 370 parts of the resulting glycerol-epichlorohydrin condensate was dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 150° C. at 20 mm. pressure. The polyglycidyl ether, in amount of 261 parts, was a pale yellow viscous liquid. It had an epoxide value of 0.671 equivalents per 100 grams and the molecular weight was 324 as measured ebullioscopically in dioxane solution. The epoxy equivalency of this product was, therefore, about 2.13. For convenience, this product will be referred to hereinafter as Polyether C.

Particularly preferred members in this group comprise the glycidyl polyethers of the aliphatic polyhydric alcohols containing from 2 to 10 carbon atoms, and more preferably the alkanediols and alkanetriols containing from 2 to 8 carbon atoms. Such products preferably have an epoxy equivalency between 1.0 and 2.5 and a molecular weight between 300 and 1000.

Another group of special interest are the polyglycidyl ethers of alpha, alpha, omega, omega-tetrakis(hydroxyaryl)alkanes, which are described in detail in U.S. Patent 2,806,016 to Schwarzer. The preparation of a compound of this type is described below.

PREPARATION OF GLYCIDYL POLYETHERS OF ALPHA,ALPHA,OMEGA,OMEGA-TETRAKIS(HYDROXYARYL)ALKANES

Polyether D

The polygylcidyl ether of 1,1,2,2-tetrakis(hydroxyphenyl)ethane was prepared by reaction of epichlorohydrin with the tetraphenol. Into a reaction vessel fitted with a heater, stirrer and reflux condenser having a separating head, a solution of 173 parts of the tetraphenol in 1610 parts of epichlorohydrin was charged and heated to about 105° C. A solution containing 70 parts of sodium hydroxide in 82 parts of water was added gradually at such a rate as to keep the reflux temperature between about 103 and 107° C. During the addition of caustic, water was distilled azeotropically with epichlorohydrin. The condensed distillate was allowed to separate continuously into two layers, and the lower epichlorohydrin layer was returned to the kettle. After addition of all the caustic, the system was azeotroped to dryness at a kettle temperature of about 116° C. and excess epichlorohydrin was distilled off as rapidly as possible until the kettle temperature reached about 126° C. About 110 parts of aqueous layer was collected. About 170 parts of a mixture of equal volumes of toluene and butanone was added to the residual reaction product, and the formed salt was filtered out. The filtrate was then distilled to remove solvents up to a temperature of about 155° C. at 5 mm. Hg pressure. The resulting polyglycidyl ether obtained in yield of 77% melted at about 85° C. and contained 0.452 epoxy equivalents per 100 grams.

According to this invention, uncured epoxy resins of the type described are admixed with both an amine and a trialkoxyboroxine to provide the foamable mixtures which are expanded to provide the desired resin foams.

Trialkoxyboroxines

The most preferred trialkoxyboroxine is trimethoxyboroxine. This compound is generally thought to have the following structural formula:

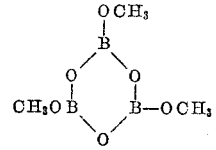

Trimethoxyboroxine is available at relatively high purity as a relatively inexpensive material of commerce. It is a colorless mobile liquid melting at about 10° C., miscible at room temperature in all proportions with a number of common solvents including aromatics such as benzene, paraffins such as 2,3-dimethylbutane, ethers such as diethyl ether, and with methyl ethyl ketone, dimethyl formamide, various esters and others. TMB reacts with water to form boric acid and methanol. For use in accordance with the present invention, therefore, TMB must be protected from excessive contacting with water. Some exposure to atmospheric moisture can be tolerated. The preparation of TMB is described, for example, by Goubeau et al. in Z. anorg. allg. Chem., 267, 1, at pp. 5–6 (1952).

Other trialkoxyboroxines suitable for use in this invention are triethoxyboroxine, tri-n-propoxyboroxine, tri-isopropoxyboroxine, and the tributoxyboroxines. These materials are not as readily and cheaply available as trimethoxyboroxine and there is ordinarily no special advantage in their use in this invention.

*Amines*

A third essential ingredient in the production of resin foams according to this invention is an amine containing at least one hydrogen attached to the amine nitrogen. Monoamines such as diethylamine, n-butylamine, N-methylaniline and aniline, if employed in sufficient amount, will serve to react with the TMB to liberate methanol and to react with the epoxy resin to cause its cure, but they are less capable of crosslinking with the epoxy resin and therefor result in an expanded resin of relatively lower strength and less desirable properties.

Preferred amines for use in this invention are aliphatic or aromatic primary or secondary polyamines. For present purposes, all those amines in which nitrogen is linked to an aliphatic carbon atom are termed aliphatic amines, even if they are otherwise aryl substituted. Suitable aliphatic amines are ethylene diamine, 1,6-hexanediamine, diethylenetriamine, triethylenetetramine, tetraethylenepentamine, 1,2-diamino-2-methylpropane, 2,3-diamino-2-methylbutane, 2,4-diamino-2-methylpentane, 2,3-diamino-2,3-dimethylbutane, m-xylylenediamine, and the like.

Another particularly preferred group of polyamines are the aromatic ones, e.g., m-phenylenediamine, o-phenylenediamine, 4,4'-diaminodiphenylsulfone, 4,4'-diaminodiphenylmethane, 1,3,5-triaminobenzene and the like.

It will be understood that not all amines are equally effective in producing foamed resins according to this invention. Products produced with different amines vary in their characteristics. For example aliphatic polyamines give colorless foams while foams produced with aromatic amines have various colors, depending on the amine selected. Thus, use of m-phenylenediamine results in a pink coloration, methylene dianiline in a green coloration, and diaminodiphenylsulfone in a lemon coloration. It has also been found that cured epoxy foams produced with aromatic di- or polyamines and TMB have higher heat resistance than those produced with aliphatic di- or polyamines.

*Vaporizable Fluids*

The vaporizable fluid which may be added as discussed above is completely soluble in the liquid resin composition at atmospheric temperature but vaporizes therefrom at elevated temperatures. The normal boiling point of such a fluid may be below atmospheric temperature provided it is sufficiently soluble in the resin composition at atmospheric temperature. The boiling point of such added vaporizable fluid is preferably in the range between about 0° C. and about 40° C., although fluids with higher boiling points may be used, especially when heat is applied externally. The chemical composition of the fluids employed is of no particular importance so long as they are not reactive with the ramaining components of the resin mixture. Suitable fluids, for example, are hydrocarbons such as pentanes, hexanes, cyclohexane, petroleum ether, or the like, and substituted hydrocarbons, e.g., alcohols and halogen-substituted hydrocarbons. Some compounds which can be dissolved in the base resin mixtures and provide expansion by vaporization at elevated temperatures may have relatively high melting points, so that they are normally solids. The term "vaporizable fluids" includes such compounds.

Preferred vaporizable fluids are those polychlorofluoro methanes having boiling points in the desired range. A series of chlorofluoroalkanes and alkenes is available from Kinetic Chemicals, Inc., Wilmington, Delaware, under the trade name "Freon" and from General Chemical Division, Allied Chemical and Dye Corporation, New York City, under the trade name "Genetron." The table lists several Freons and Genetrons which are suitable for use in the present invention. Other materials of this series having boiling points near or above atmospheric temperature may, however, also be employed.

TABLE

| "Freon" | "Genetron" | Formula | Boiling Point (° C.) |
|---|---|---|---|
| "Freon-11" | "Genetron-11" | $CCl_3F$ | 23.7 |
| "Freon-21" |  | $CHCl_2F$ | 8.9 |
| "Freon-114" | "Genetron-316" | $CClF_2\text{-}CClF_2$ | 3.5 |
| "Freon-112" | "Genetron-112" | $CCl_2F\text{-}CCl_2F$ | 92.8 |

Particularly outstanding results are obtained with trichlorofluoromethane.

*Fillers*

The strength of the resin foams produced according to this invention may be substantially increased at the expense of some increase in density by including fillers in the composition prior to expansion. Suitable fillers are aluminum dust, asbestos, glass wool, glass microballoons, phenolic microballoons, clays, asphaltines, as well as numerous other inert materials known to be useful in similar applications.

*Thixotropic Agents*

For some particular applications the presence of a thixotropic agent in the foamable mixture is desired. This is useful where the resin mixture is to be applied as a thin coating to a surface and subsequently expanded. Thixotropic agents which may be employed for this purpose include many highly absorptive materials such as pigments, asbestos floc, silicate clays, micas, colloidal silica, organic complexes of bentonite, attapulgite, metallic soap powders, metallic leafing powders, finely divided solidified vegetable oil derivatives and the like. Preferred thixotropic agents are quaternary ammonium bentonite complexes such as dimethyl didodecyl ammonium bentonite, dimethyl dodecyl tridecyl ammonium bentonite, and the like, which are commercially available under the trade name Bentone.

PROPORTIONS OF COMPONENTS

The proportions of the several ingredients employed in producing the foamable resin mixtures of this invention are suitably expressed in terms of parts by weight per hundred parts of epoxy resin (phr.).

The amount of polyamines employed is suitably in the range from 5 to 45 phr.

When the trialkoxyboroxine is TMB the amount thereof used is suitably in the range from 10 to 40 phr. Proportionately larger amounts of the other boroxines are suitably employed, e.g., 12 to 45 phr. of triethoxyboroxine, 15 to 60 phr. of tripropoxyboroxine, or 18 to 70 of tributoxyboroxine.

The amount of filler which can be employed in these compositions is a function of the physical properties of the fillers. Thus, finely divided aluminum dust has been employed in concentrations as high as 150 phr. Its use in concentrations of 75 phr. produces a particularly useful product. Other fillers are generally used in much lower concentrations in parts by weight because of their lower density. For example, glass microballoons may be suitably employed in concentrations up to 25 phr. Vaporizable fluids, such as trichlorofluoromethane, can be used in amounts up to 30 phr.

METHOD OF PREPARING FOAMS

In the preparation of foamed resins according to this invention, it is usually preferred to prepare a mixture of the desired liquid epoxy resin or mixture of epoxy resins with the desired amount of the amine compound to be employed. When the amine is normally liquid the mixture may be prepared at atmospheric temperature. Otherwise, the epoxy resin is heated, the amine dissolved therein, and the mixture cooled back to a temperature at least not substantially above atmospheric temperature. When a vaporizable fluid is used it is added to the cool mixture of resin and amine.

When the mixture of liquid epoxy resin and amine is ready, the desired amount of trialkoxyboroxine is added thereto and quickly dissolved in it by suitable agitation. If this mixing takes place at about atmospheric temperature, the reaction by which alkanol liberation and curing take place commences immediately, the temperature of the mixture begins to rise and within a few minutes expansion to the expanded foam structure begins. Foaming is generally substantially complete within a period of thirty minutes. The maximum temperature attained during the expansion step is generally in the range from 200 to 350° F.

When it is desired to delay the expansion, the liquid mixture of epoxy resin and amine may be cooled to a temperture in the range from 50 to 70° F. and the TAB added thereto. In this manner, foaming may be delayed to about one half hour after the addition of TAB. Addition of a fluid such as trichlorofluoromethane also tends to delay foaming.

In the above described methods of foam preparation the mixture is held as a body of liquid in a suitable container in order to permit the exothermic heat of reaction to provide the driving force for the expansion. When it is desired to produce a foam from a thin layer of the liquid, e.g., about 1/16 inch in thickness, the heat of reaction is rapidly dissipated through the thin film and external heat must therefore be supplied to produce the foaming. This may be done, for example, by placing articles coated with foamable mixture into an oven, e.g., at 80° C., or applying radiant heat to coated surfaces by means of irradiation with a heat lamp.

EXAMPLES

The invention will be further illustrated by means of the following examples, which however are not to be interpreted as limiting the invention in any manner. In the examples, "parts" are parts by weight unless otherwise indicated.

EXAMPLE 1

Formulation:

| Component— | Parts |
|---|---|
| Polyether "A" | 100 |
| 4,4'-diaminodiphenylsulfone | 20 |
| Liquid silicone | 0.2 |
| TMB | 30 |

*Method of Preparation*

The desired amount of Polyether A is heated to about 260° F. The amine is then added in portions while the total mixture is maintained at that temperature and rapidly stirred. After the amine has been dissolved, the silicone liquid is incorporated and the mixture promptly cooled to room temperature. Stirring is continued and the TMB incorporated into the liquid mixture. The mixture is promptly poured into the vessel in which it is to be expanded. The curing and expanding reaction commence without external heating. The mixture becomes warm and expands as methanol is released by the reaction. Expansion is complete in about 5 minutes, and curing substantially completed in another 5 minutes without application of external heat.

*Properties of the Cured Form*

Using 50 g. of Polyether "A," the procedure resulted in 12 fold expansion of the liquid mass. The foam had a uniform structure of small, mostly closed cells of about 0.5 mm. average diameter. Its density was about 5 lb./cu. ft.

EXAMPLE 2

Formulation:

| Component— | Parts |
|---|---|
| Polyether "A" | 100 |
| 4,4'-diaminodiphenylsulfone | 20 |
| TMB | 30 |

*Method of Preparation*

Expanded resin foam was prepared in substantially the same manner as in Example 1. It will be noted that the formualtions are identical except for omission of the silicone liquid, which was thought to contribute to evenness and fineness of foam structure.

*Properties of the Cured Foam*

The properties of foam produced as above described were essentially identical to those described in Example 1.

EXAMPLE 3

Formulation:

| Component— | Parts |
|---|---|
| Polyether "A" | 100 |
| 4,4'-diaminodiphenylsulfone | 40 |
| TMB | 40 |

*Method of Preparation*

Expanded resin foam was prepared substantially as in Example 1. Expansion commenced about one minute after TMB was added to the polyether-amine solution.

It will be noted that both the ratio of total curing agents (amine plus TMB) to polyepoxide and the ratio of amine to TMB were higher than in Examples 1 and 2. This resulted in releast of more heat and a greater volume of methanol and consequently a lower density foam.

*Properties of the Cured Foam*

Using 50 g. of Polyether "A," the procedure resulted in 45 fold expansion of the liquid mass. The foam had a uniform structure of small, mostly closed cells of about 0.3 average diameter. Its density was about 1.3 lb./cu. ft.

EXAMPLE 4

Formulation:

| Component— | Parts |
|---|---|
| Polyether "A" | 100 |
| Diethylene triamine | 20 |
| Tributoxyboroxine | 30 |

*Method of Preparation*

Expanded resin foam was prepared substantially as in Example 1.

It will be noted that a different amine and a different trialkoxyboroxine were employed, but the relative proportions were the same as in Example 1.

*Properties of the Cured Foam*

Using 50 g. of Polyether "A," the procedure resulted in six fold expansion of the liquid mass. The foam had a fairly uniform structure of closed cells of about 3 mm. average diameter. Its density was amout 10 lb./cu. ft.

EXAMPLE 5

Formulation:

| Component— | Parts |
|---|---|
| Polyether "A" | 100 |
| m-Phenylenediamine | 20 |
| Aluminum dust (200 mesh) | 50 |
| Glass microballoons (30–300 mu) | 30 |
| TMB | 10.5 |

*Method of Preparation*

The desired amount of Polyether "A" was heated to about 120° F. The portions of the molten amine were then added while the total mixture was maintained at that temperature and rapidly stirred. The aluminum dust and glass microballoons were then mixed into the solution and the mixture promptly cooled to about room temperature. The TMB was added with stirring and the mixture placed into the vessel where it was to be expanded. The curing and expanding reaction commenced at room temperature. Expansion commenced about four minutes after TMB was added.

*Properties of the Cured Foam*

The procedure resulted in three fold expansion of the liquid mass. The foam had a uniform structure of small, mostly closed cells of about 1 mm. average diameter. Its density was about 20 lb./cu. ft.

EXAMPLE 6

Formulation:

| Component— | Parts |
|---|---|
| Polyether "A" | 80 |
| Polyether "D" | 20 |
| m-Phenylenediamine | 20 |
| Aluminum dust (200 mesh) | 75 |
| TMB | 11 |

*Method of Preparation*

Expanded resin foam was prepared substantially as in Example 5.

It will be noted that in this preparation a combination of two polyepoxides was employed. Polyether "D" is a solid at room temperature. It was dissolved in Polyether "A" at 120° F. before the other ingredients were added. It will also be noted that a higher proportion of aluminum dust and no glass microballoons were used, resulting in greater foam density.

*Properties of the Cured Foam*

Using 1000 g. of Polyether "A," the procedure resulted in two fold expansion of the liquid mass. The foam had a uniform structure of small, mostly closed cells of about 1 mm. average diameter. Its density was about 35 lb./cu. ft.

EXAMPLE 7

Formulation:

| Component— | Parts |
|---|---|
| Polyether "A" | 100 |
| 4,4'-diaminodiphenylsulfone | 20 |
| Trichlorofluoromethane | 10 |
| TMB | 30 |

*Method of Preparation*

The mixture of Polyether "A" and amine is prepared substantially as in Example 1 and is cooled to slightly above room temperature, e.g., about 30° C. The required amount of trichlorofluoromethane is then incorporated and the mixture cooled to room temperature. TMB is then added with stirring while the mixture is at room temperature. The mixture is poured into the vessel in which it is to be expanded.

*Properties of the Cured Foam*

Using 50 g. of Polyether "A," the procedure resulted in twenty-five fold expansion. The resulting cured foam had a density of 2.5 lb./cu. ft. and a cell size of about 0.1–0.2 mm. diameter.

EXAMPLE 8

| Formulation | Parts | |
|---|---|---|
| | Blend I | Blend II |
| Component: | | |
| Polyether "A" | 40 | 40 |
| Polyether "B" | 60 | 60 |
| Aniline | 30 | 30 |
| Metaphenylene diamine | 0 | 7.5 |
| Trichlorofluoromethane | 10 | 10 |
| TMB | 30 | 30 |

*Method of Preparation*

Separate blends are prepared, substantially as described in Example 7.

Compared with Example 7, the above formulations utilize different amine curing agents and modify the polyether by including in part a normally solid one. The polyethers are blended after heating.

*Properties of the Cured Foam*

The inclusion of the normally solid polyether resulted in a foam which is less friable than that of Example 7. However, gelation proceeded more slowly.

The mixtures expanded twenty fold and resulted in densities of about 3 lb./cu. ft. The use of aniline as sole amine results in a less crosslinked, weaker foam structure.

EXAMPLE 9

Formualtion:

| Components— | Parts |
|---|---|
| Polyether "A" | 50 |
| Asphalt [1] | 50 |
| Metaphenylene diamine | 10 |
| TMB | 25 |

[1] Penetration 85/100

*Method of Preparation*

The mixture was prepared essentially like that of Example 8.

*Properties of the Cured Foam*

Using 50 g. of polyether, the procedure resulted in ten fold expansion. The density of the cured composition was 6 lb./cu. ft., and the average cell diameter about 0.5 to 2 mm.

EXAMPLE 10

Formulation:

| Components— | Parts |
|---|---|
| Polyether "A" | 45 |
| Modified polyepichlorohydrin | 55 |
| 4,4'-diaminodiphenylsulfone | 20 |
| Antimony oxide | 4 |
| Trichlorofluoromethane | 10 |
| TMB | 40 |

*Method of Preparation*

The resins and amine were blended at an elevated temperature and the mixture cooled before addition of trichlorofluoromethane and TMB. The complete mixture was quickly placed into the vessel where expansion was to take place.

*Properties of the Cured Foam*

The mixture expanded twenty fold, resulting in a foam having a density of 3 lb./cu. ft. The foam was self extinguishing when tested for flame resistance.

EXAMPLE 11

Formulation:

| Components— | Parts |
|---|---|
| Polyallylglycidyl ether | 100 |
| Metaphenylene diamine | 12 |
| TMB | 25 |

*Method of Preparation*

The liquid epoxide and the solid amine were blended at about 60° C. TMB was added and the mixture placed into a vessel for expansion. It was found that this blend foamed more quickly than those of Polyether "A."

*Properties of the Cured Foam*

The mixture expanded six fold, resulting in a foam of 10 lb./cu. ft. density.

EXAMPLE 12

Formulation:

| Components— | Parts |
|---|---|
| Epoxidized novolak resin [1] | 100 |
| 4,4'-diaminodiphenylsulfone | 20 |
| Trichlorofluoromethane | 10 |
| TMB | 30 |

[1] Polyglycidyl ether of novolak resin; has 2.2 epoxy groups per molecule; epoxide equivalent weight=176.

*Method of Preparation*

The expandable mixture was prepared substantially as in Example 7.

*Properties of Cured Foam*

The mixture expanded forty fold. The density of the resulting foam was 1.5 lb./cu. ft.

EXAMPLE 13

Formulation:

| Components— | Parts |
|---|---|
| Epoxidized silicone [1] | 100 |
| 4,4'-Diaminodiphenylsulfone | 20 |
| Trichlorofluoromethane | 10 |
| TMB | 30 |

[1] A cyclic silicone of the average formula

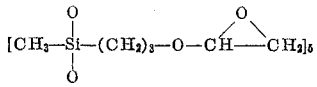

*Method of Preparation*

The expendable mixture was prepared substantially as in Example 7. The foam gelled within one minute of TMB addition.

*Properties of the Cured Foam*

The mixture expanded six fold, yielding a foam of 10 lb./cu. ft. density.

I claim as my invention:

1. A foam resin product obtained by the simultaneous reaction of a mixture of (1) a resin-forming liquid polyepoxide reactant having an epoxy equivalent greater than 1.0, (2) at least 10 parts, per 100 parts polyepoxide, of a trialkoxyboroxine having from one to four carbon atoms in each alkoxy group, and (3) an amine containing at least one hydrogen attached to an amine nitrogen.

2. A foam resin product obtained by the simultaneous reaction of a mixture of (1) a normally liquid glycidyl polyether of 2,2-bis(4-hydroxyphenyl)propane, (2) at least 10 parts, per 100 parts of said glycidyl polyether, of trimethoxyboroxine, and (3) a polyamine containing at least one hydrogen attached to an amine nitrogen.

3. A foam resin product obtained by the simultaneous reaction of a mixture of (1) a normally liquid glycidyl polyether of 2,2-bis(4-hydroxyphenyl)propane, (2) 10 to 40 parts, per 100 parts of said glycidyl polyether, of trimethoxyboroxine and (3) 5 to 45 parts, per 100 parts of said glycidyl polyether, of a polyamine containing at least one hydrogen attached to an amine nitrogen.

4. A foam resin product obtained by the simultaneous reaction of a mixture comprising (1) a resin-forming liquid polyepoxide reactant having an epoxy equivalent greater than 1.0, (2) at least 10 parts, per 100 parts polyepoxide, of a trialkylboroxine having from one to four carbon atoms in each alkoxy group, and (3) an amine containing at least one hydrogen attached to an amine nitrogen, said mixture further containing an inert vaporizable liquid selected from the group consisting of hydrocarbons containing 5 to 6 carbon atoms and having a boiling point up to 40° C. and halogenated hydrocarbons having from 1 to 2 carbon atoms.

References Cited in the file of this patent

FOREIGN PATENTS 783,956    Great Britain    Oct. 2, 1957

UNITED STATES PATENT OFFICE
CERTIFICATE OF CORRECTION

Patent No. 3,025,249                                    March 13, 1962

Harold H. Chen

It is hereby certified that error appears in the above numbered patent requiring correction and that the said Letters Patent should read as corrected below.

In the heading to the printed specification, line 3, in the title, for "TRIALKYLBOROXINE" read -- TRIALKOXYBOROXINE --; column 1, line 63, for "alkyl" read -- alkoxy --; column 2, line 3, for "trialkyl-" read -- trialkoxy- --; column 3, line 44, for "bis(2,2-" read -- bis(2,3- --; line 57, for "bisphenyl" read -- bis-phenol --; column 7, line 20, for "therefor" read -- therefore --; line 64, for "ramaining" read -- remaining --; column 10, line 34, for "releast" read -- release --; line 60, for "amount" read -- about --; column 14, line 26, for "trialkylboroxine" read -- trialkoxyboroxine --.

Signed and sealed this 7th day of August 1962.

(SEAL)
Attest:

ERNEST W. SWIDER                                    DAVID L. LADD
Attesting Officer                                         Commissioner of Patents